UNITED STATES PATENT OFFICE.

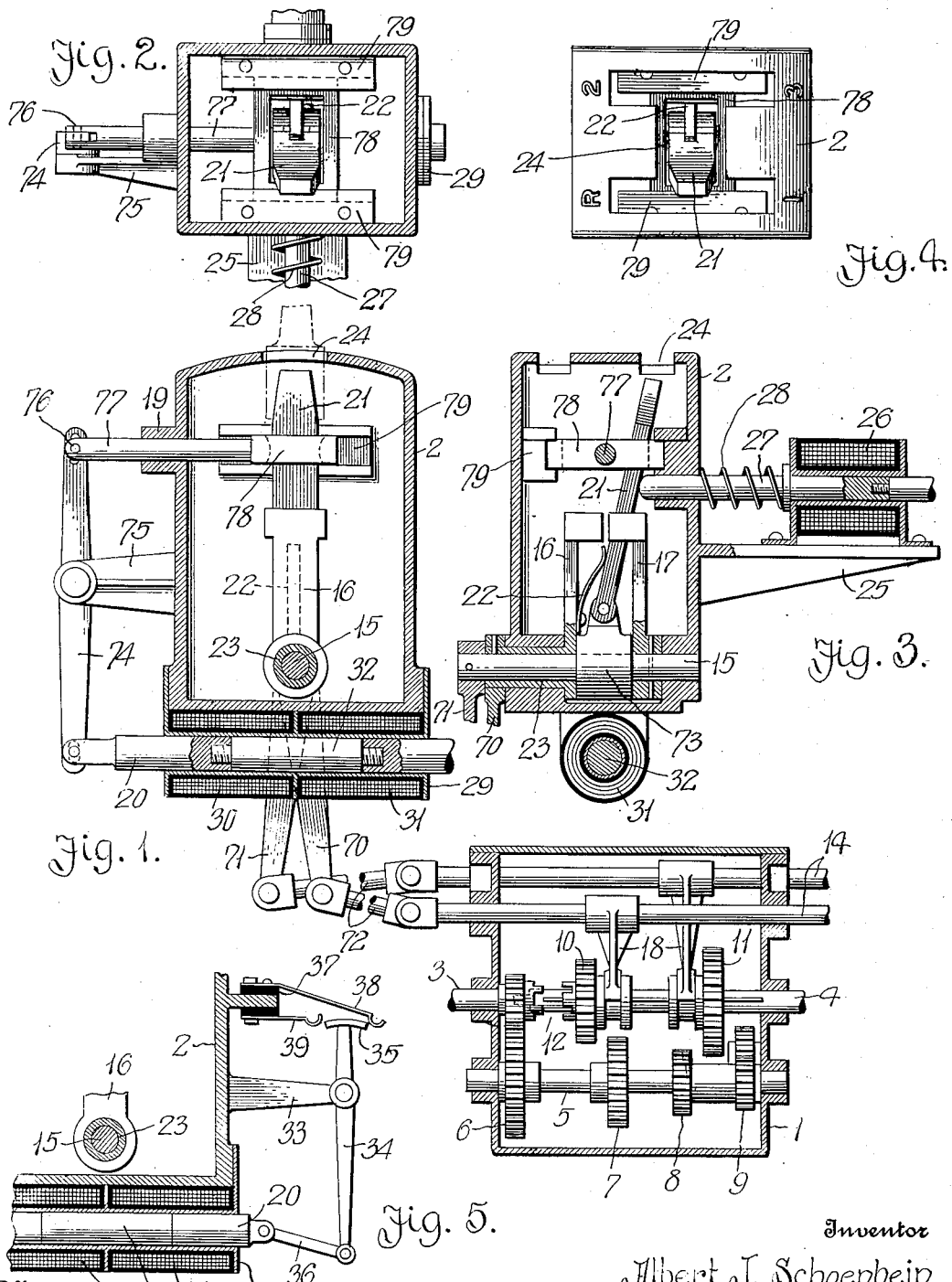

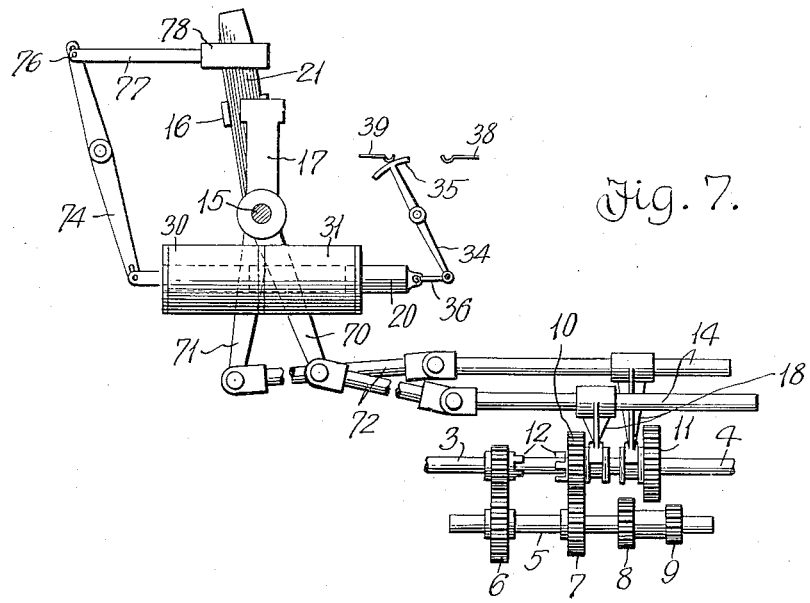
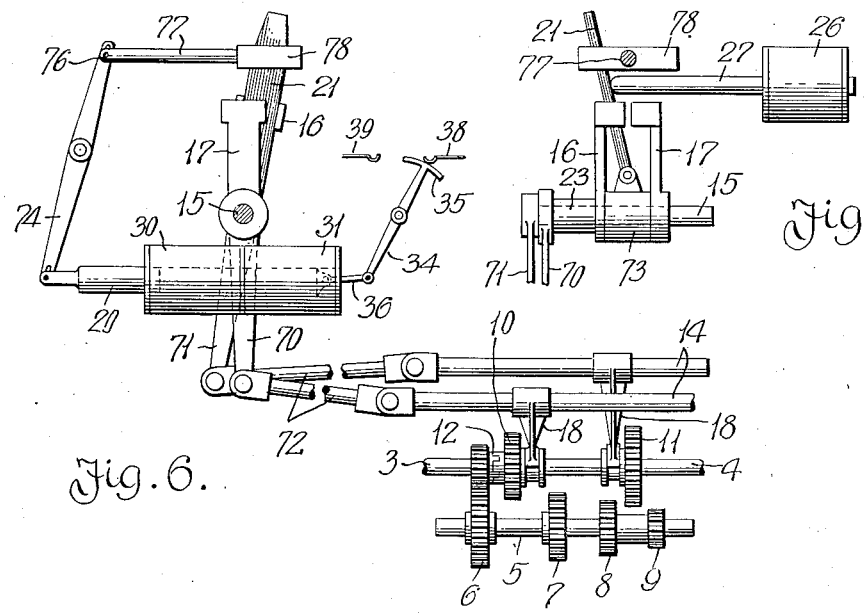

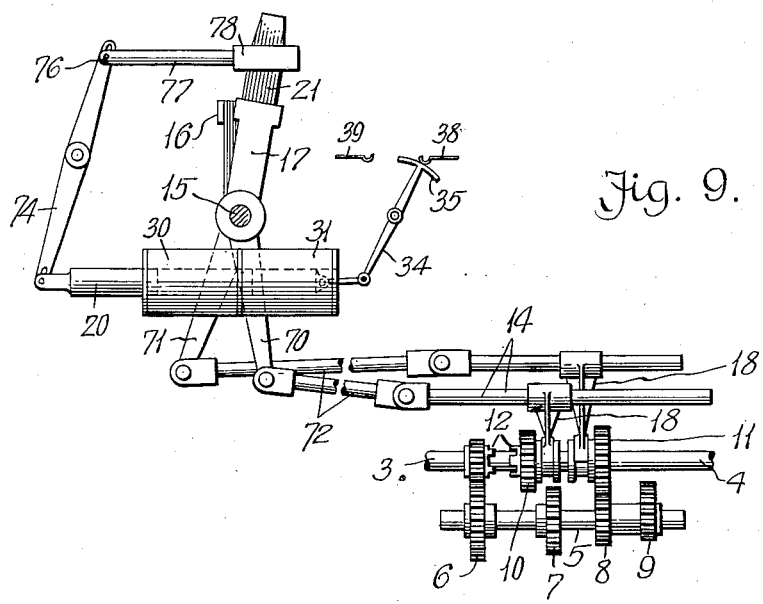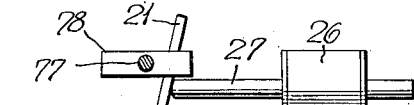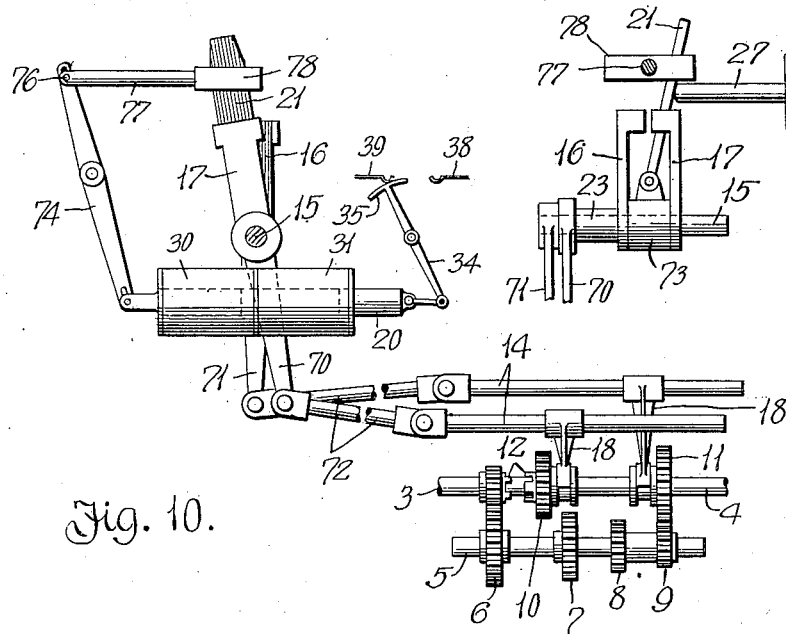

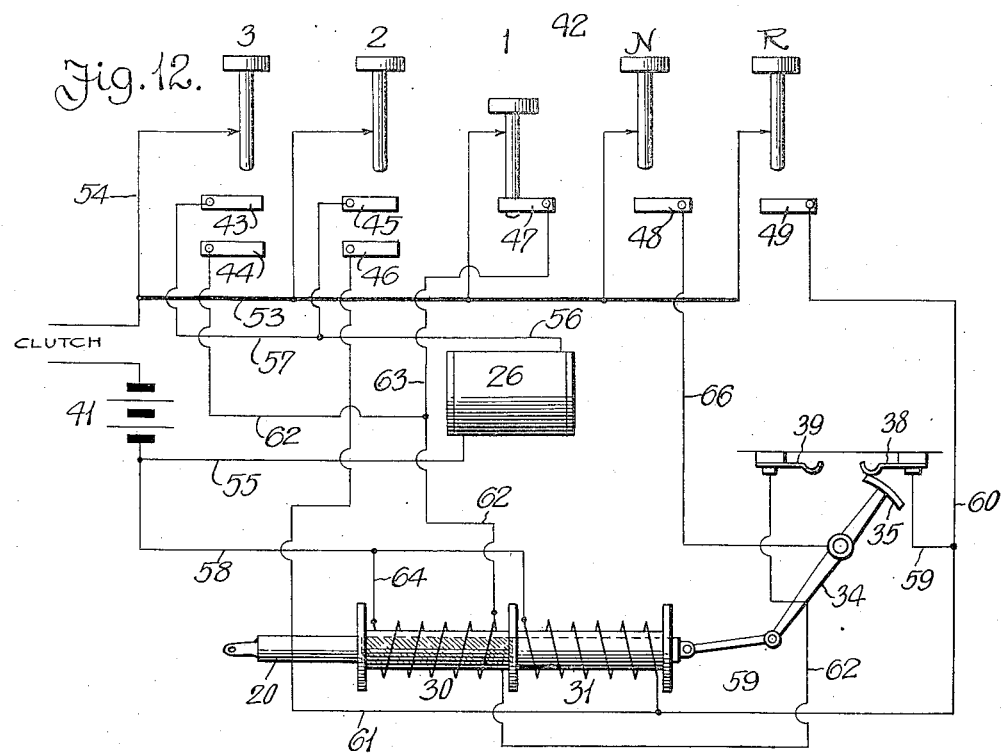

ALBERT J. SCHOENBEIN, OF FORT WAYNE, INDIANA.

AUTOMATIC GEAR-SHIFTING MECHANISM.

1,279,767.  Specification of Letters Patent.  Patented Sept. 24, 1918.

Application filed December 29, 1916. Serial No. 139,656.

*To all whom it may concern:*

Be it known that I, ALBERT J. SCHOENBEIN, a citizen of the United States of America, residing at Fort Wayne, in the county of Allen and State of Indiana, have invented certain new and useful Improvements in Automatic Gear-Shifting Mechanism, of which the following is a specification, reference being had therein to the accompanying drawings.

In my companion application filed under even date there is disclosed an automatic gear shifting mechanism wherein the shifting mechanism is located directly above the change speed gear transmission mechanism, and as the shifting mechanism is also designed to be manually operated, it is necessary that the change speed gear transmission mechanism be located near the engine or motor of a vehicle so that the shifting mechanism may be operated by the chauffeur or driver of a vehicle should occasion so require.

The present invention has special reference to an automatic gear shifting device that may be located at a point remote to the change speed gear transmission mechanism, for instance, the transmission mechanism may be in proximity to the rear axle of a motor driven vehicle, while the shifting mechanism is located in proximity to the motor of the vehicle or contiguous to the control or foot board of the vehicle. Widely separating the shifting mechanism and the transmission mechanism necessitates certain connections between the two mechanisms, together with certain improvements in connection with the shifting mechanism, and these improvements are associated with electrical devices as in my companion application, and by which a desired change in the change speed gear transmission mechanism may be easily accomplished.

The arrangement of the improvements above referred to will be hereinafter described and then claimed, and reference will now be had to the drawings, wherein—

Figure 1 is a vertical sectional view of the gear shifting mechanism, the change speed gear transmission mechanism, with connections therebetween broken away, the gear shifting mechanism and the change speed transmission mechanism in neutral position;

Fig. 2 is a plan of the gear shifting device, partly broken away and partly in section;

Fig. 3 is a cross sectional view of the gear shifting device;

Fig. 4 is a plan of the same, illustrating an H plate;

Fig. 5 is a longitudinal sectional view of a portion of the shifting device;

Fig. 6 is an elevation of the two mechanisms, in third speed position;

Fig. 7 is a similar view of the mechanism in second speed position;

Fig. 8 is a front elevation of a portion of the shifting mechanism in second and third speed position;

Fig. 9 is a side elevation of the two mechanisms in first speed position;

Fig. 10 is a similar view of the mechanisms in reverse speed position;

Fig. 11 is a front elevation of a portion of the shifting mechanism, similar to Fig. 8 showing reverse and first speed positions;

Fig. 12 is a diagrammatic view showing the electrical devices and the connections thereof, and Fig. 13 is a cross sectional view of the change speed transmission mechanism.

In this specification reference numerals will be used to indicate parts like or very similar to parts designated by the same reference numerals in my companion application. To start off with, the reference numeral 1 denotes a transmission casing and 2 a casing for the gear shifting mechanism, these casings being separated in contradistinction to the superposed relation disclosed by my companion application.

Extending into the casing 1 is an engine shaft 3 alining with a drive shaft 4 and journaled in said casing is a countershaft 5, a train of gears 6 permits of the engine shaft 3 imparting movement to the countershaft 5 and this shaft has a second speed gear 7, a first speed gear 8, and a reverse gear 9. Slidable on the drive shaft 4 and adapted to rotate therewith are shiftable gears 10 and 11, and a clutch 12 forms part of the shiftable gear 10.

Slidable in the upper portion of the casing 1 are reciprocable gear shift rods 14 provided with forks 18, said forks being disposed to shift the gears 10 and 11 when the rods 14 are reciprocated.

Journaled in the lower portion of the casing 2 is a rock shaft 15 and fixed on said shaft is a bifurcated or slotted shifting member 17 extending upwardly into the casing. In spaced and opposed relation to the shifting member 17 there is a shifting member 16, which is also slotted or bifurcated and this member has a hub portion 23 loose on the rock shaft 15 and extending out of the casing 2. Fixed on the outer end of the hub 23 is a crank 70 and fixed on the outer end of the rock shaft 15 is a crank 71. These cranks are adapted to be connected to the shift rods 14 of the casing 1 by connecting rods 72.

Loose on the rock shaft 15 between the members 16 and 17 is a support 73 for a pivoted shifting arm 21 that is normally held in a neutral position in a slot or bifurcation of the member 17 by a resilient arm 22 connected to the member 16. The shifting arm 21 extends upwardly within the casing 2 in proximity to the top of said casing, which is slotted, as at 24, and corresponds to an H plate having suitable indicia as best shown in Fig. 4. The upper end of the arm 21 is tapered and is adapted to receive a lever or similar device (not shown) so that the arm 21 may be manually shifted if necessary.

At one side of the casing 2 is a bracket 25 supporting an electrical device in the form of a solenoid 26. This solenoid has a core 27 extending into the casing 2 into engagement with the shifting arm 21. The greater part of the core 27 is of non-magnetic material, while the remaining part thereof is of magnetic material so that when the solenoid 26 is energized, the core will be shifted farther into the casing 2 to move arm 21 into the slot or bifurcation of the member 16. A coiled spring 28 encircling the core 27 is adapted for restoring the core to normal position.

The casing 2 has depending brackets 29 for a double solenoid consisting of windings 30 and 31, said windings having a common core 20 provided with a magnetic portion 32. One end of the core 20 is suitably connected to a fulcrumed arm 74 carried by a bracket 75 forming part of the casing 2. The upper end of the fulcrumed arm 74 is loosely connected, as at 76, to a rod 77 extending into the casing 2 through a bearing 19 provided therefor. The inner end of the rod 77 has a yoke 78 through which the upper end of the shifting arm extends, and said yoke is slidable in grooved guides 79, carried by the inner walls of the casing 2. The opposite end of the core 20 of the double solenoid is connected by a link 36 to a switch arm 34 fulcrumed on a bracket 33, carried by the casing 2. On the upper end of the switch arm 34 is a contact member 35 adapted to engage resilient contact fingers 38 and 39 insulated from each other and suitably supported from the casing 2, as indicated at 37.

Reference will now be had to Fig. 12 illustrating diagrammatically the gear shifting mechanism associated with a selector device 42, and as in my prior inventions, a clutch coöperates with the selector device in controlling electric circuits in connection with the various electrical devices. The clutch has not been shown but lead out connections are indicated. The selector device comprises a series of push buttons for reverse, neutral, first, second and third speed positions and as such will be hereinafter referred to. The third speed button is adapted to progressively engage contacts 43 and 44; the second speed button engages contacts 45 and 46; the first speed button engages a single contact 47; the neutral button engage a single contact 48 and the reverse button engages a single contact 49. With the clutch out and the gears in neutral position, either of the selector buttons may be depressed to complete electric circuits, and a suitable source of electrical energy, as batteries 41 is shown as adapted to be connected to a bus bar 53 through the clutch. Other electrical connections are as follows:

The solenoid 26 is connected by a wire 55 to the batteries 41 and by wires 56 and 57 to the contacts 45 and 43 respectively.

The winding 31 of the double solenoid is connected by a wire 58 through the batteries 41 and by wires 59 to the contact finger 38. The wires 59 are connected by wires 60 and 61 to the contacts 49 and 46 respectively.

The contact 44 of the third speed button is connected by wire 62 to the contact finger 39 and one of the wires 62 is connected by the wires 63 to the contact 47 of the first speed button.

The winding 30 of the double solenoid is connected by a wire 64 to the wire 58 leading to the batteries 41 and by wires 62 and 63 to the contact 47.

The contact 48 of the neutral button is connected by a wire 66 to the switch arm 34.

To explain operations of the gear shifting mechanism I will assume that the gears are in neutral position, as shown in Fig. 1, and that the first speed button of the selector device is depressed to engage the contact 47. The following circuit is established. Batteries 41 through the clutch to the bus bar 53, first speed button to contact 47, wire 63 to the winding 30 of the double solenoid, and by wires 64 and 58 to the batteries 41. That portion of the double solenoid having the winding 30 is energized and the core 20 is shifted. Through the medium of the fulcrumed arm 74 and the rod 77, the yoke 78 is moved in its guides 79 and as the shifting arm 21 extends through said yoke, the shifting member 17 is swung or oscillated by reason of the support 73 being loose on the rock shaft 15. Since the member 17 is fixed relative to the rock shaft 15, said shaft is rocked and through the medium of the crank 71, one of the rods 72 and one of the rods 14, the gear 11 is shifted into mesh with the first speed gear 8 of the transmission mechanism.

Simultaneously with the operation of the core 20, the switch arm 34 places the contact member 35 thereof in engagement with the contact finger 38, and an open circuit is established in connection with the winding 31 of the double solenoid and the neutral button of the selector device, so that when the neutral button is depressed, that portion of the double solenoid having the winding 31 will be energized, thus restoring the core 20 and the switch arm 34 to normal or neutral position. The yoke 78, when retracted, will restore the shifting arm 21 to vertical position and the resilient arm will retain the shifting arm in engagement with the shifting member 17.

As the neutral position of the shifting arm 21 is always for reverse and first speed gear positions, it is necessary to shift the arm 21 into engagement with the member 16 for second and third speed gear position, and this can be readily accomplished since the arm 21 is pivotally connected to the supports 73. By reference to Fig. 3, it will be noted that when the solenoid 26 is energized that the core 27 thereof will push the arm 21 into engagement with the shifting member 16, and this is first accomplished in connection with either the second or third speed buttons of the selector device. For instance, when the second speed button engages the contact 45 a circuit is established to energize the solenoid 26, and then when the second speed button engages the contact 46 a circuit is established through the double solenoid to shift the member 16 and obtain a second speed gear position.

From the foregoing, it will be observed that an important feature in connection with the shifting mechanism is the shifting arm 21 which can be oscillated in two planes approximately at right angles to each other, the oscillation in one plane determining the position of the arm relative to the shifting members 16 and 17, and the oscillation in the other plane determining the direction in which either of the members 16 or 17 is moved. In both instances, electrical devices accomplish the movements, and as in my companion application, the switch controlling the neutral circuit is automatically actuated.

What I claim is:—

1. In an automatic gear shifting mechanism, oscillatory members adapted for changing the gears of a change speed mechanism, a pivoted shifting arm between said members, means maintaining said shifting arm normally in engagement with one of said members, an electrical device adapted to shift said arm from its member to the other member, and an electrical actuated yoke at the upper end of said arm adapted for moving said arm in a plane at an angle to that in which said arm may have been moved by the first mentioned electrical device.

2. In an automatic gear shifting mechanism, oscillatory members adapted for changing the gears of a change speed mechanism, a pivoted shifting arm between said members, means maintaining said shifting arm normally in engagement with one of said members, an electrical device adapted to shift said arm from its member to the other member, a yoke engaging said arm, a double solenoid in circuit with a suitable source of electrical energy adapted to move said arm, and a selector device controlling the operation of the double solenoid.

3. In an automatic gear shifting mechanism, the combination with a source of electrical energy, oscillatory members adapted for changing the gears of a change speed mechanism, a pivoted arm between said members, means maintaining said shifting arm normally in engagement with one of said members, an electrical device in circuit with said source of electrical energy and including a yoke adapted to move said arm, a selector device adapted to establish circuits in connection with said electrical device, and a switch automatically actuated by said electrical device adapted to establish an open circuit for said selector device so that said selector device may be actuated to restore said electrical device and said arm to normal position.

4. In an automatic gear shifting mechanism, the combination with a suitable source of electrical energy, of oscillatory members adapted for changing the gears of a change speed mechanism, a pivoted arm between said members, means engaging said arm adapted to hold said arm normally in engagement with one of said members, electrical means in circuit with said source of electrical energy including a yoke adapted to move said arm, a selector device adapted to establish circuits in connection with said electrical devices, and a switch automatically actuated by said electrical device adapted to establish an open circuit for said selector device so that said selector device may be actuated to restore the first mentioned electrical device and said arm to normal position.

5. The combination with a change speed gear transmission mechanism having shiftable rods adapted for moving gears of said transmission mechanism, a suitable source of electrical energy, and a selector device, of a gear shifting mechanism remote relatively to the transmission mechanism, comprising members connected to said transmission mechanism, an arm between said members adapted for moving said members, means maintaining said shifting arm normally in engagement with one of said members, and electrical devices in circuit with said source of electrical energy and controlled by said selector device adapted for shifting said arm in planes at an angle to each other.

6. The combination with a change speed gear transmission mechanism having shiftable rods adapted for moving gears of the transmission mechanism, a suitable source of electrical energy and a selector device, of a gear shifting mechanism remote relatively to the transmission mechanism, comprising members connected to the rods of said transmission mechanism, an arm between said members adapted for moving said members, means maintaining said arm in engagement with one of said members, an electrical device in circuit with said source of electrical energy controlled by said selector device adapted for moving said arms from one member to the other, and an electrical device in circuit with said source of electrical energy and controlled by said selector device adapted for shifting said arm after engagement with one of said members.

7. The combination with a change speed gear transmission mechanism having shiftable rods adapted for moving gears of said transmission mechanism, a suitable source of electrical energy, and a selector device in circuit therewith, of gear shifting mechanism remote relatively to said transmission mechanism, comprising members connected to the rods of said transmission mechanism, an arm between said members adapted for moving said members, means for maintaining said arm in engagement with one of said members, an electrical device in circuit with said source of electrical energy and controlled by said selector device adapted for moving said arm from one member to the other, a yoke over the upper end of said arm, a double solenoid in circuit with said source of electrical energy and controlled by said selector device and adapted for moving said yoke to shift said arm after engagement with one of said members, and a switch actuated by said double solenoid adapted to establish an open circuit in connection with said selector device so that said selector device may be operated to restore said double solenoid to normal condition.

8. The combination with a change speed gear transmission mechanism having gear positions known as first, second, third, reverse and neutral positions, of an oscillatory arm adapted for changing the gears of the transmission mechanism for different positions, electro-mechanical means adapted to oscillate said arm in one place to select second and third or reverse and neutral positions, means maintaining said arm normally in position for third and reverse position, and electrical means including a double solenoid adapted to oscillate said arm in another plane to select one of the two positions selected by the electro-mechanical means.

In testimony whereof I affix my signature in the presence of two witnesses.

ALBERT J. SCHOENBEIN.

Witnesses:
K. D. FITCH,
F. ELMER SCHMÖE.